US007937196B2

(12) United States Patent
Watanabe et al.

(10) Patent No.: US 7,937,196 B2
(45) Date of Patent: May 3, 2011

(54) LANE BOUNDARY DETECTOR

(75) Inventors: Akihiro Watanabe, Nagoya (JP);
Makoto Nishida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1133 days.

(21) Appl. No.: 11/074,658

(22) Filed: Mar. 9, 2005

(65) Prior Publication Data

US 2005/0209748 A1 Sep. 22, 2005

(30) Foreign Application Priority Data

Mar. 12, 2004 (JP) ................................. 2004-070037

(51) Int. Cl.
*G01C 22/00* (2006.01)
*B60Q 1/00* (2006.01)
(52) U.S. Cl. ............ 701/23; 701/28; 701/208; 382/104; 340/435; 340/436; 340/438
(58) Field of Classification Search .................. 382/104; 701/28, 208; 340/436
See application file for complete search history.

(56) References Cited

U.S. PATENT DOCUMENTS

| 5,341,437 | A | | 8/1994 | Nakayama | |
|---|---|---|---|---|---|
| 5,359,666 | A | | 10/1994 | Nakayama et al. | |
| 5,379,353 | A | * | 1/1995 | Hasegawa et al. | 382/104 |
| 5,790,403 | A | * | 8/1998 | Nakayama | 701/28 |
| 6,128,088 | A | * | 10/2000 | Nishiwaki | 356/392 |
| 6,133,824 | A | * | 10/2000 | Lee et al. | 340/435 |
| 6,449,383 | B1 | * | 9/2002 | Oike et al. | 382/104 |
| 6,489,887 | B2 | * | 12/2002 | Satoh et al. | 340/436 |
| 6,577,334 | B1 | | 6/2003 | Kawai et al. | |
| 2001/0056326 | A1 | * | 12/2001 | Kimura | 701/208 |
| 2002/0041229 | A1 | * | 4/2002 | Satoh et al. | 340/438 |
| 2002/0081001 | A1 | * | 6/2002 | Tsuji | 382/104 |
| 2002/0131620 | A1 | * | 9/2002 | Shirato | 382/104 |

FOREIGN PATENT DOCUMENTS

| JP | A-08-261756 | 10/1996 |
|---|---|---|
| JP | A-11-085999 | 3/1999 |
| JP | A 11-232467 | 8/1999 |
| JP | A-2001-289654 | 10/2001 |
| JP | A-2002-197469 | 7/2002 |

(Continued)

OTHER PUBLICATIONS

Partial European Search Report dated May 20, 2010.

(Continued)

*Primary Examiner* — Khoi Tran
*Assistant Examiner* — Ian Jen
(74) *Attorney, Agent, or Firm* — Oliff & Berridge, PLC

(57) ABSTRACT

A lane boundary detector includes an edge point extracting unit that extracts a plurality of edge points of a lane sign from the input image, and an edge line extracting unit that extracts a plurality of edge lines of the lane sign from the edge points to formulate a position and a direction of each of the edge lines as a straight line on the road surface, using a parameter set consisting of at least two variables. The detector further includes a branch point detecting unit that determines whether a crossing point of two of the edge lines can be a branch point of the lane, based on whether a characteristic difference vector defined with the variables with respect to the two edge lines falls within a predetermined appropriate range, and a lane boundary determining unit that determines the left and the right boundary positions of the lane.

11 Claims, 12 Drawing Sheets

FOREIGN PATENT DOCUMENTS

| | | |
|---|---|---|
| JP | A 2002-312797 | 10/2002 |
| JP | A 2003-168123 | 6/2003 |

OTHER PUBLICATIONS

Aug. 18, 2010 European Search Report issued in European Patent Application No. 05005375.0.

May 7, 2008 Office Action issued in Japanese Patent Application No. 2004-070037 (with Translation).

Jul. 22, 2008 Decision of a Patent Grant issued in Japanese Patent Application No. 2004-070037 (with Translation).

* cited by examiner

LANE BOUNDARY DETECTOR

BACKGROUND OF THE INVENTION

1. Field of the Invention

The present invention relates to a detector that detects in real time a position of a lane sign drawn on a road surface, for example, to determine a boundary of lanes based on an image obtained via a vehicle-mounted camera. The lane boundary detector according to the present invention can be utilized as a useful apparatus for a vehicle driving support system, for example, which executes an operation to automatically keep a vehicle inside the lane.

2. Description of the Related Art

Examples of conventionally known detectors that detect in real time the position of the lane boundary indicated by the lane sign drawn on the road surface can be seen, for example, in Japanese Patent Laid-Open No. H11-232467 and Japanese Patent Laid-Open No. 2002-312797.

The detector disclosed in Japanese Patent Laid-Open No. H11-232467 examines a plurality of road surface images which are periodically captured, and analyzes characteristics of a temporal change in a relative positional relation between two white lines that indicate the lane boundaries, to determine whether a main road has a branch road or not.

The detector disclosed in Japanese Patent Laid-Open No. 2002-312797 first determines which white line that indicates the lane boundary is to be eventually adopted, and then determines whether the selected white line has a branch point or not.

The detector according to Japanese Patent Laid-Open No. H11-232467, however, does not provide a desirable result of detection in real time since the detector determines whether the branch exists or not based on a plurality of or many road surface images.

On the other hand, it is difficult for the detector according to Japanese Patent Laid-Open No. 2002-312797 to achieve a simple, flexible, constant and speedy selection of the proper white line indicating the lane boundary based on the result of the branch presence determination, since the detector first determines the white line to be examined and then determines whether there is a white line corresponding to a branch road in the vicinity of, i.e., outside the selected white line.

On highways, vehicles are generally supposed to drive at the speed of 20 to 30 meters per second at the slowest. Hence, when the road surface images are input to the detector in a cycle of 100 milliseconds, for example, the vehicle would move forward approximately three meters while the detector detects and determines a branch point in one image input cycle behind. In the vicinity of lane branch point, a road surface image corresponding to the actual road surface of approximately three meters' length, particularly of an area around the vehicle and more specifically of areas in front of and right behind the vehicle, provides various important pieces of information that allow the correct branch determination. Hence, even the time lag of one image input cycle cannot be overlooked. Thus, the technique according to Japanese Patent Laid-Open No. 2002-312797 does not satisfactorily solve the problem of time lag in determination process.

Though it would be possible to mount a high performance camera on the vehicle to set a shorter image pick-up cycle, such solution would increase the manufacturing coat.

In addition, the conventional lane boundary detectors cannot readily distinguish different types of lanes. For example, when the lane boundary is indicated by a combination of lines such as a plurality of white lines or dotted lines, the lane boundary cannot be readily separated, i.e., the contour thereof and the correct boundary cannot be distinguished depending on various factors such as the position of vehicle-mounted camera, the resolution of image pick-up, the driving speed of the vehicle, and the clarity of the lane indication. Hence, the conventional lane boundary detector is not immune to detection error when determination is made based on ill-defined road surface image, particularly when a white line candidate is selected in the vicinity of the branch point of a branch road.

SUMMARY OF THE INVENTION

It is an object of the present invention to solve the problems as described above. In particular, an object of the present invention is to provide at a reasonable cost a lane boundary detector that is immune to detection error and time lag with respect to branch road detection.

A first aspect of the present invention relates to a lane boundary detector that detects in real time while a vehicle is running a right and a left boundary position of a lane that is defined by a lane sign drawn on a road surface on which the vehicle runs based on an image input via a vehicle-mounted camera. In particular, the lane boundary detector includes an edge point extracting unit that extracts an edge point of the lane sign from the input image; an edge line extracting unit that extract an edge line of the lane sign from the extracted edge point, and formulate a position and a direction of the edge line as a straight line on the road surface, using a set of parameters $(p, q (, \ldots))$ of real numbers consisting of at least two variables; a branch point detecting unit that determines whether a crossing point of the edge lines i and j can be a branch point of the lane, based on whether a characteristic difference vector $(p_i-p_j, q_i-q_j)$ defined with two appropriate arbitrary variables $(p, q)$ among the parameters of real numbers falls within a predetermined appropriate range with respect to the two extracted edge lines i and j; and a lane boundary determining unit that determines the left and the right boundary positions of the lane based on a determination result by the branch point detecting unit.

The subscripts to the variables p and q indicate the names of corresponding edge lines such as i and j. Two variables p and q may be selected from appropriate parameters of real numbers that indicate the position, the direction, or the like of the edge line. When the selection of the parameters is appropriate, the characteristics difference vector $(p_i-p_j, q_i-q_j)$ can be a valuation plan that simply indicates the difference between positional relations of the edge lines i and j, i.e., the characteristics difference of the edge lines i and j.

According to this aspect, a branch point where a branch road diverts from a main road can be readily detected from one road surface image. When the parameters of real numbers representing the position or the direction of the edge line are properly selected as the two variables (p, q), the characteristics difference vector $(p_i-p_j, q_i-q_j)$ can be used as a barometer that clearly indicates the difference between the positional relations of the edge lines i and j. When the characteristics difference vector $(p_i-p_j, q_i-q_j)$ falls within an appropriate range, it signifies that the edge lines i and j intersect with each other at a proper angle on the road surface whose image is picked up.

In other words, the two variables, i.e., the parameters p and q that uniquely indicate the position or the direction of the edge line can be properly selected so that the characteristics difference vector $(p_i-p_j, q_i-q_j)$ would fall within a predetermined range when the extracted edge lines i and j intersect with each other at a proper angle as a branch of the road on the road surface whose image is picked up.

In a second aspect of the present invention, when the road surface is represented by an xy-orthogonal coordinate plane where a positive direction of the y-axis represents a forward direction of the vehicle and a positive direction of an x-axis represents a right ward direction of the vehicle, the first variable is substantially the same with an x-coordinate of the first edge line or the second edge line on a straight line that satisfies y=D in front of the vehicle where D is a predetermined distance, and the second variable is substantially the same with an angle formed by the first edge line or the second edge line with respect to the positive direction of the y-axis.

In addition, for example, provided that an xy-orthogonal coordinate plane represents the road surface plane, where the positive direction of the y-axis represents the forward direction of the vehicle, the positive direction of the x-axis represents the right ward direction of the vehicle, and the equation of the edge line of the lane sign is expressed as x=ay+b, the coefficients of the equation, such as "a" and "b" may be employed as the parameter, i.e., two variables (p, q).

According to this aspect, the position and the direction of any edge line can be uniquely represented with the x-coordinate and the angle θ. Further, the branch point of the branch road from the main road can be readily, efficiently and effectively detected from one image of the road surface.

For example, if the proper range mentioned above is defined by expressions $|x_i-x_j| \leq \alpha 1$ and $\epsilon 1 \leq |\theta_i-\theta_j| \leq \beta 1$, a pair of two edge lines with appropriate distance and angle from each other can be detected. In other words, a pair of two edge lines that can be properly determined to represent a branch of the road in the vicinity of the coordinate y=D in front of the vehicle can be detected. When the vehicle is on the highway, in general, an appropriate value of β1 is approximately 20°. The value may be dynamically changed in communication with a navigation system or the like.

Alternatively, the road surface plane may be represented by an xy-orthogonal coordinate plane where the positive direction of the y-axis represents the forward direction of the vehicle and the positive direction of the x-axis represent the right ward direction of the vehicle. Then, the edge line of the lane sign may be represented by expression x=ay+b, and the variable parameters (a, b) of the expression may be used as the two variables (p, q). Such selection of variable parameters also provides the same advantages.

In a third aspect of the present invention, when the road surface plans is represented by a coordinate plane where a positive direction of an x-axis represents the right ward direction of the vehicle, and when the branch point detecting unit determines whether a branch point from which a branch diverts leftward is present or not, the two edge lines i and j selected as determination data are both an edge line that represents a set of points where value ∂L/∂x takes a negative minimum value, and the value ∂L/∂x is obtained by partial differentiation of luminance L of the input image with respect to the x-coordinate.

In a fourth aspect of the present invention, when the road surface plane is represented by a coordinate plane where a positive direction of an x-axis represents the right ward direction of the vehicle, and when the branch point detecting unit determines whether a branch point from which a branch diverts rightward is present or not, the two edge lines i and j selected as the determination data are both an edge line that represents a set of points where value ∂L/∂x takes a positive maximum value, and the value ∂L/∂x is obtained by partial differentiation of luminance L of the input image with respect to the x-coordinate.

When the lane sign is constituted from a combination of lines such as a plurality of white lines or dotted lines, the lane boundary cannot be readily separated, i.e., the contour thereof and the correct boundary cannot be distinguished depending on various factors such as the resolution of image pick-up by the vehicle-mounted camera, the driving speed of the vehicle, and the clarity of the lane indication. According to the third and fourth aspects, a more accurate branch road detection is allowed based on a more accurate selection of edge lines even when the lane sign in the picked-up image is ambiguous.

In a fifth aspect of the present invention, one of the branch point detecting unit and the lane boundary determining unit determines whether the branch point of the lane is present or not, based on whether a characteristic difference vector (($p_i$-$p_k$, $q_i$-$q_k$) or ($p_j$-$p_k$, $q_j$-$q_k$)) defined by two appropriate arbitrary variables (p, q) among the parameters of real numbers falls within a predetermined appropriate range or not with respect to at least one of the two edge lines i and j whose crossing point is determined likely to be the branch point of the lane and a reference edge line k (pk, qk) that is a predetermined object of comparison.

According to this aspect, the validity of the shape of the detected branch road can be verified with reference to more accurate data, i.e., the reference edge line k. Hence, the noise image of the road surface is prevented from causing an error in branch road determination. In other words, it is verified that at least one of two edge lines i and j, whose crossing point is supposed to be the branch point of the lane, is substantially the same with the predetermined highly reliable reference edge line k, whereby the crossing point is determined to be the branch point of the lane.

Here, the predetermined proper range may be set with a certain margin. Then, even when the nose of the vehicle vertically bobbles due to the roughness of the road and the angle of image pick-up, i.e., the depression angle fluctuates over time, a flexible detection and determination is allowed.

In a sixth aspect of the present invention, when the branch point detecting unit determines that the crossing point of the edge lines i and j is the branch point of the lane, the lane boundary determining unit selects an edge line that is located within a range of appropriate distance from a center line of a lane on which the vehicle is currently running and that is located closest to the center line among a plurality of edge lines that constituting a contour of the lane sign that includes the edge line i or j as the edge line, as one of the left boundary position and the right boundary position of the vehicle which are to be sought in the end.

According to this aspect, on branch point detection, the innermost edge line among the pertinent edge lines is selected as the lane boundary position. Hence, when there is a branch road, the vehicle can ignore the branch road and keep running on the main road. This is advantageous since the vehicle driving support system or the like usually focuses on the support of continuous driving on the main road, for example, on the highway, up to a branch, a parking area, a service area, or a toll booth.

A seventh aspect of the present invention relates to a lane boundary detector that detects in real time while a vehicle is running a right and a left boundary position of a lane that is defined by a lane sign drawn on a road surface on which a vehicle runs based on an image input via a vehicle-mounted camera. In particular, the lane boundary detector includes an edge point extracting unit that extracts an edge point of the lane sign from the input image; an edge line extracting unit that extracts an edge line of the lane sign from the extracted edge point, and formulate a position and a direction of the edge line as a straight line on the road surface, using a set of parameters (p, q ( . . . )) of real numbers consisting of at least two variables; and a validity-verifying unit that verifies validity of the edge line i as the boundary position of the lane based on whether a characteristic difference vector $(p_i-p_k, q_i-q_k)$ defined with two appropriate arbitrary variables (p, q) among the parameters of real numbers falls within a predetermined appropriate range with respect to the extracted edge line i and a reference edge line k $(p_k, q_k)$ which is a predetermined object of comparison.

According to this aspect, the validity verifying process for the edge line i may be independently performed on a single edge line before the branch point detection. Such validity verifying process may be performed before the determination process of the branch point detection, or at the time of an arbitrary noise determination process performed apart from the branch point detection process. The process of determining whether a particular line is an edge line or a noise may enhance the reliability of various determination processes relating with the validity of the edge line.

In an eighth aspect of the present invention, an edge line to be used as the reference edge line k is determined based on the latest adopted boundary position of the lane.

In a ninth aspect of the present invention, the lane boundary detector further includes an image dividing unit that horizontally divides the input image into a plurality of areas. An edge line that corresponds with the boundary position of the lane in a lower area than a target area in a horizontally divided image is employed as the reference edge line k.

According to the eighth and ninth aspects, as the reference edge line k, an edge line that is expected to be the boundary based on the lane boundary position previously adopted, or an edge line that matches with the lane boundary position in the lower area than the target area in the horizontally divided image may be employed.

Additional objects, features, and advantages of the present invention will be apparent from the following detailed description of preferred embodiments thereof, which are best understood with reference to the accompanying drawings.

DETAILED DESCRIPTION OF THE PREFERRED EMBODIMENTS

Exemplary embodiments of the present invention will be described below. Note that the present invention is not limited to the particular embodiments.

Figure 1:
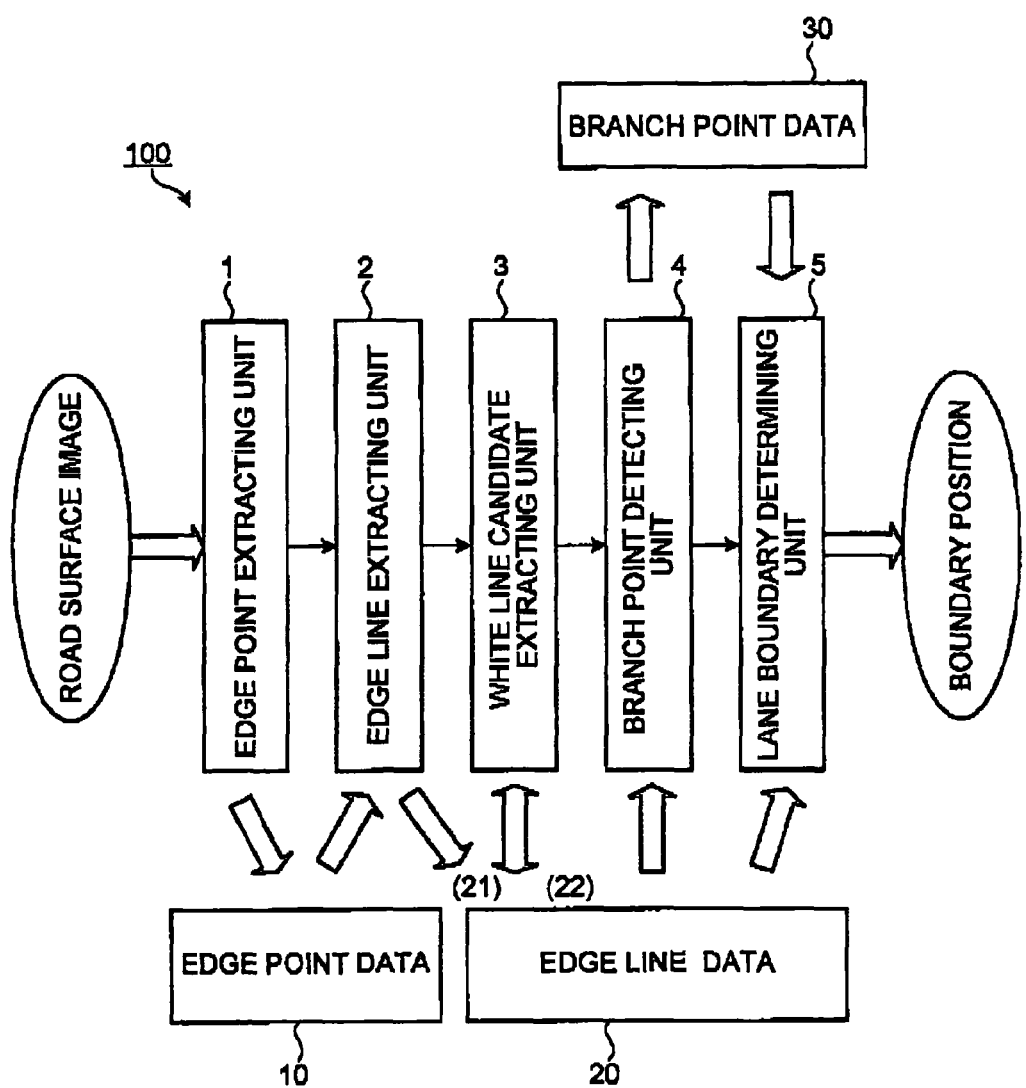
FIG. 1 is a schematic diagram of a logical system structure of a lane boundary detector 100 according to a first embodiment of the present invention.

FIG. 1 shows a logical system structure of a lane boundary detector 100 according to a first embodiment. The edge point extracting unit 1 extracts an edge point based on a road surface image (hereinafter also referred to as image data) picked up by a vehicle-mounted camera, to store the extracted edge point as edge point data in a predetermined storage area such as a table 10. Here, the edge point is a point constituting a contour of lane sign such as a white line. The units 1 to 5 are realized with a computer system that communicates with the vehicle-mounted camera and has a known structure.

The edge line extracting unit 2 extracts an edge line which is a contour of the lane sign based on the edge point data, to store the data representing the edge line, i.e., edge line data, into a predetermined storage area such as a table 20.

The white line candidate extracting unit 3 verifies a validity of the edge line data stored in the table 20 based on predetermined properties such as a white line width and a lane width, to delete a record of noise data, i.e., data on a line which does not constitute the contour of the lane sign, in the table 20.

The branch point detecting unit 4 generates branch point data on a table 30 based on the edge line data stored in the table 20. The present invention focuses particularly on the branch point detecting unit 4.

The lane boundary determining unit 5 determines the position of a lane boundary based on the edge line data stored in the table 20 and the branch point data stored in the table 30.

Figure 2A:
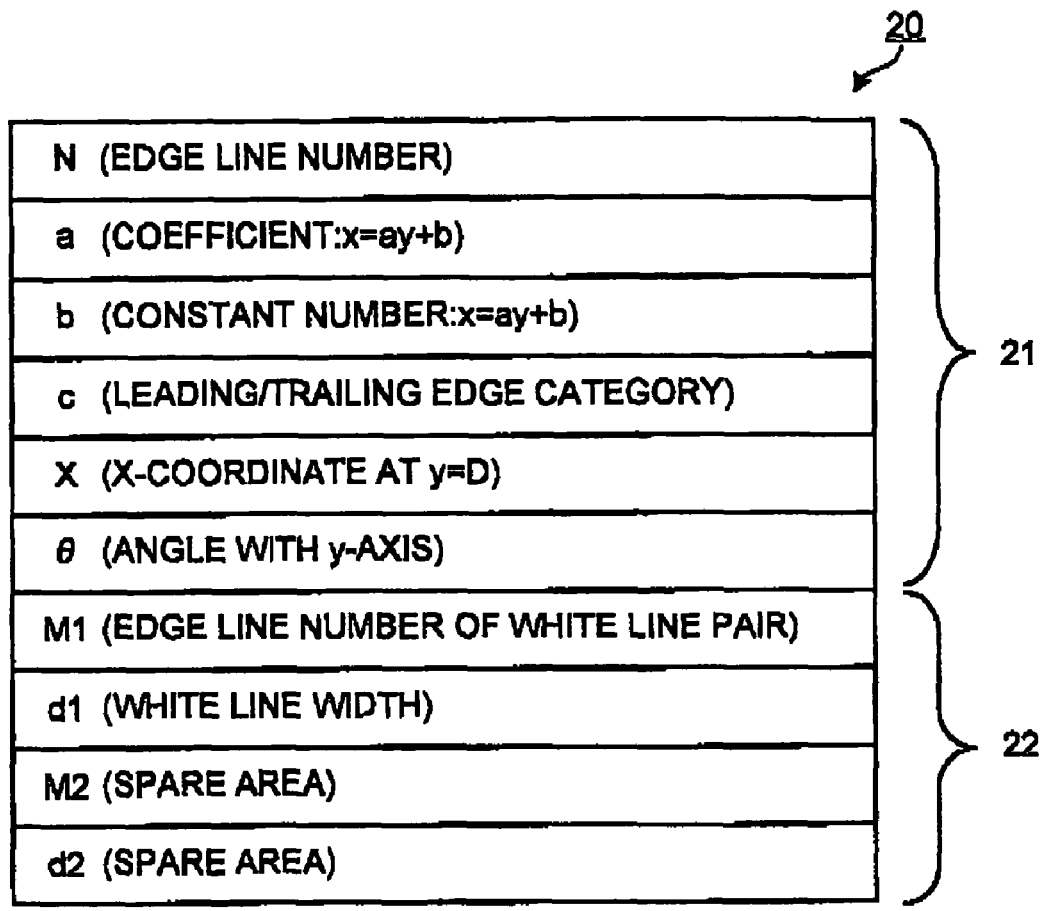
FIG. 2A is a diagram of a table 20 that stores edge line data and FIG. 2B is a diagram of a table 30 that stores branch point data.
Figure 2B:

FIG. 2A shows the table 20 that stores the edge line data and FIG. 2B shows the table 30 that stores the branch point data. Information of every extracted edge line is recorded in the tables. Next, the information recorded in the tables is described in detail. Note that in the first embodiment, the road surface plane, on which the vehicle drives, is represented by an xy-orthogonal coordinate where the positive direction of the y-axis represents the forward direction of the vehicle, the positive direction of the x-axis represents the right ward direction of the vehicle, and the origin represents the front end of the center of the vehicle. A leading edge line is an edge line consisting of points that represent the positive maximum of a partial differentiation $\partial L/\partial x$ of luminance L of the input image with respect to the x-coordinate, i.e., the left side contour of the white line. The same applies to the term "trailing edge line".

The table 20 includes variables:

N: edge line number;
a: primary coefficient of an edge line equation (x=ay+b);
b: constant term of the edge line equation (x=ay+b);
c: edge line category, i.e., leading or trailing;
X: x coordinate of an edge line on a straight line y=D (here, the position of the straight line y=D is arbitrary and is not limited to the bottom position of the image shown, for example, in FIG. 4B);
θ: angle of an edge line with respect to the positive direction of y-axis (the value of "θ" increases clockwise. θ=0 on the y-axis and θ>0 when the edge line inclined to the right.);

M1: edge line number of a counterpart constituting a white line pair;
d1: width of the white line;
M2: edge line number of a counterpart constituting a white line pair (spare area); and
d2: width of the white line (spare area).

The table 30 includes variables:
Y: y-coordinate of a crossing point (branch point) of two edge lines;
I: edge line number of an edge line with a branch point; and
J: edge line number of an edge line with a branch point.

Figure 3:
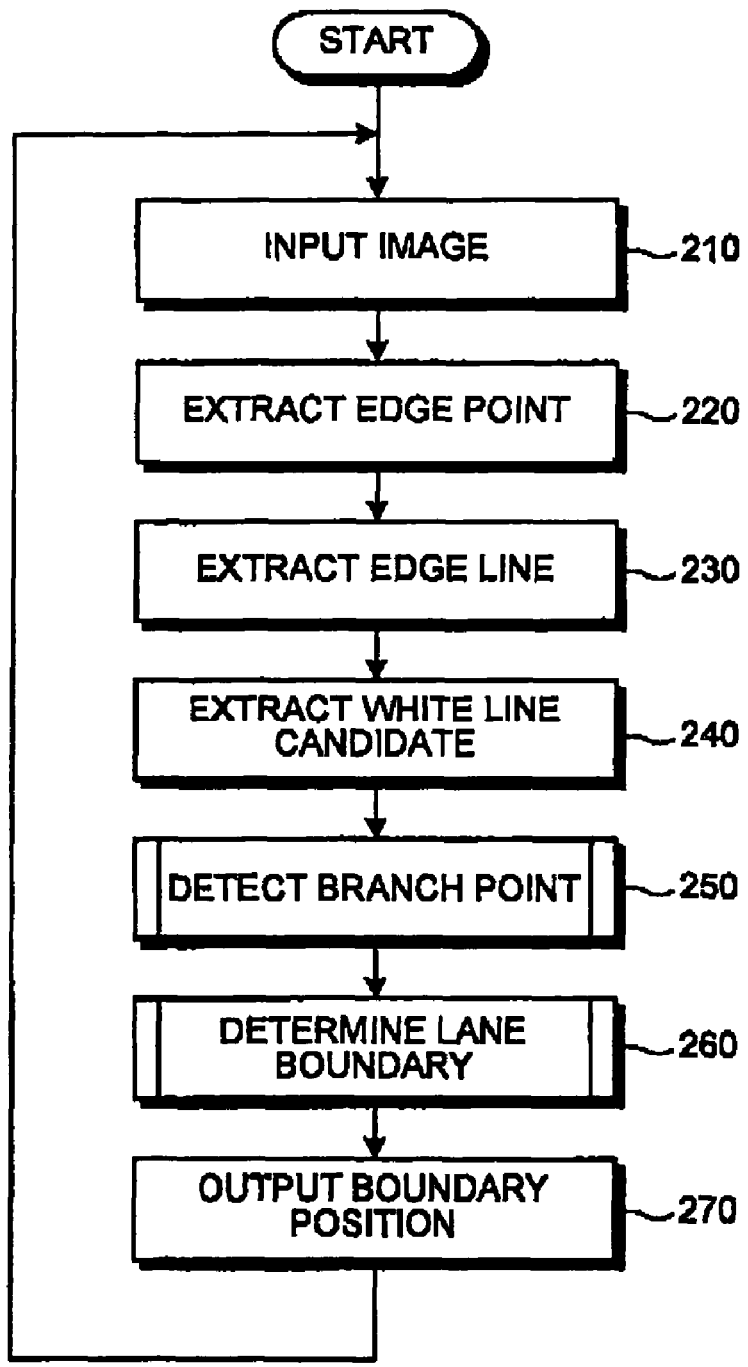
FIG. 3 is a general flowchart of a control program of the lane boundary detector 100.
Figure 4A:
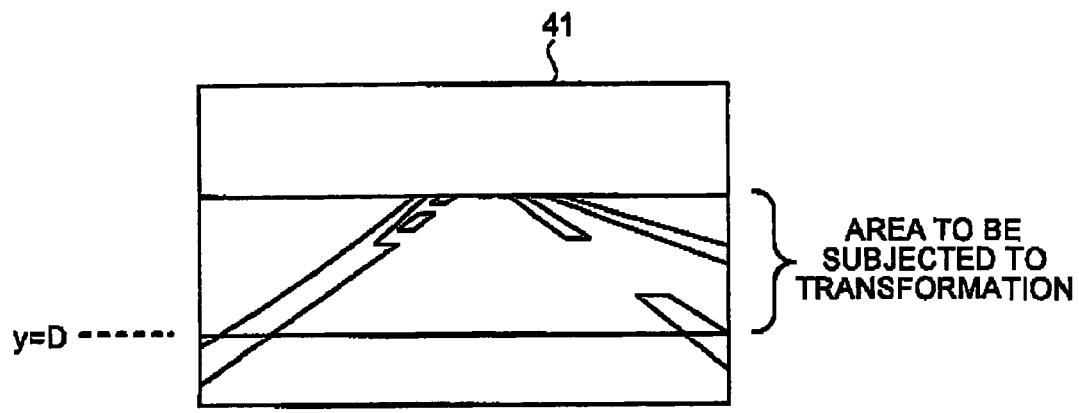
FIG. 4A is a diagram of image data 41 in an input road surface image and FIG. 4B is a diagram of a birds-eye view 42 obtained via a geometric transformation of the image data 41.

FIG. 3 is a general flow chart of a control program 200 of the lane boundary detector 100. To the lane boundary detector 100, a road surface image is first input via the vehicle-mounted camera at step 210. An example of image data 41 as the input road surface image is shown in FIG. 4A.

Figure 4B:
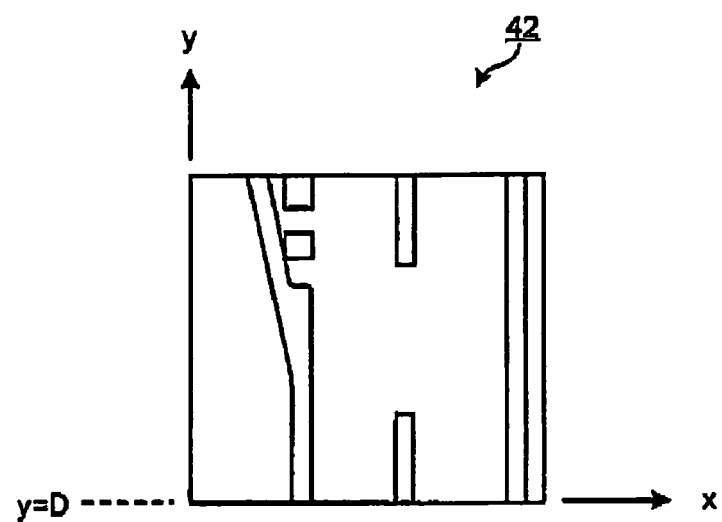
Figure 5A:
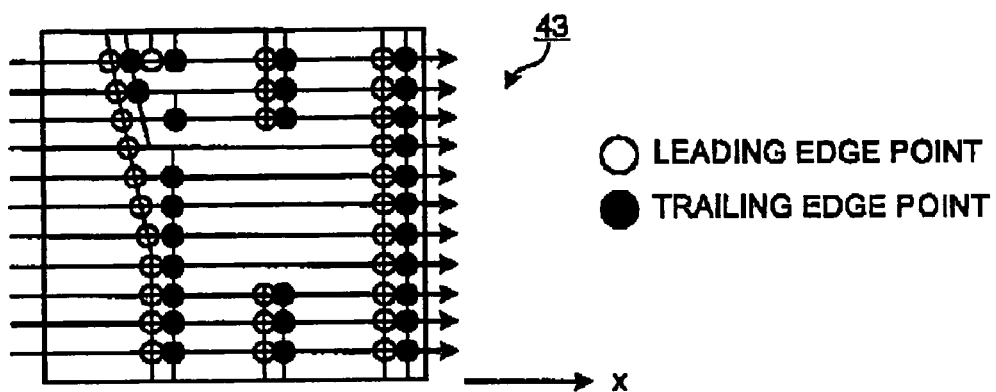
FIG. 5A is a graph of an image of edge point data obtained via differentiation process.

Next at step 220, the edge point extracting unit 1 executes the edge point extracting process with known techniques such as geometric transformation or differentiation. FIG. 4B shows an example of a birds-eye view image 42 which can be obtained by the geometric transformation of a target area of the image data 41. FIG. 5A shows a graph 43 of another edge point data image obtained via differentiation.

Figure 5B:
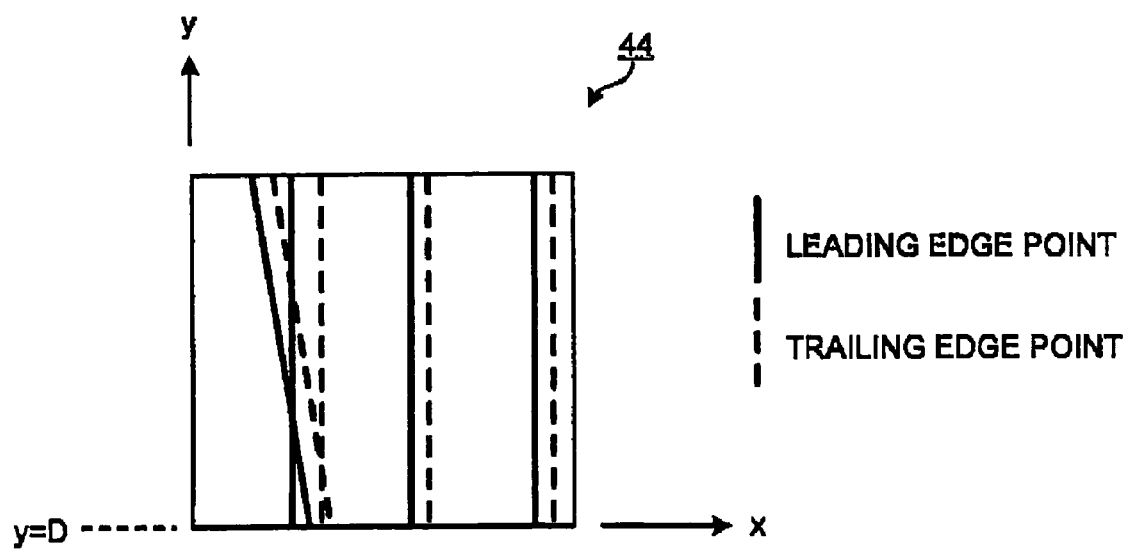
FIG. 5B is a graph of an image of edge line information obtained via Hough transform.

Next at step 230, the edge line extracting unit 2 extracts edge lines with known technique such as Hough transform. A graph 44 of FIG. 5B represents an image of edge line data obtained via Hough transform on the edge point data in the table 10. In the edge line extracting process, each piece of data 21 consisting of six variables "N", "a", "b", "c", "X", and "θ" shown in FIG. 2A is found and updated. For example, the edge line number N is allocated in an ascending order from one in accordance with an increase in value of X.

Exemplary procedure of information processing relating to the processes described above can be found, for example, in Japanese Patent Laid-Open No. 2003-168123, which is incorporated herein by reference.

Figure 5C:
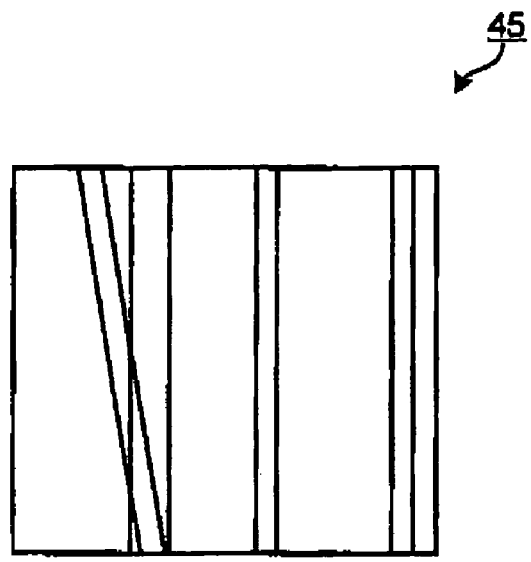
FIG. 5C is a graph of an image of white line information obtained via a white line extracting process.

Next at step 240, the white line candidate extracting unit 3 extracts a white line candidate that satisfies a predetermined consistency. A graph 45 of FIG. 5C represents an image of white line information obtained via the white line extracting process. In step 240, an edge line candidate constituting an allowable white line is extracted based on the consistency with the white line width, the lane width or the like. When a pair of leading edge line and trailing edge line forms a white line with a proper width at a proper x-coordinate, the lines are extracted as a desirable white line candidate. The edge line category of the edge line which is a counterpart in the white line pair is reverse. For the edge lines that satisfy the consistency, "M1" (edge line number of the counterpart in the white line pair) and "d1" (the width of the white line) are recorded on the edge line table 20.

Even when the edge line of the counterpart in the white line pair cannot be determined, if the edge line is located at a position which can be assumed to be the lane boundary, the record is not deleted. However, the variables "M1" and "d1" of such edge line in the record are not updated. The spare area (M1 and d1) may be used when two counterparts are found for the white line pair, for example.

A procedure of detecting a branch point on the left side of the lane on which the vehicle is currently driving will be described below. The detection of a branch point on the right side can be conducted in the same manner and the description thereof will not be repeated.

After step 240, at step 250 the branch point detecting unit 4 detects a branch point from which a branch road diverts from the lane (main road) on which the vehicle is currently running.

Figure 6:
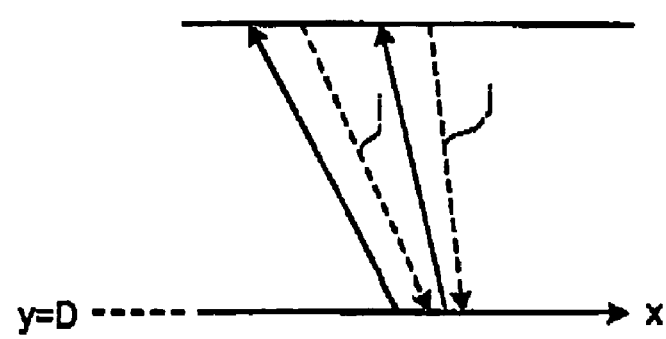
FIG. 6 is an explanatory diagram of a process for detecting a branch point shown in FIG. 5 (step 250)

FIG. 6 is an explanatory diagram of a process of detecting a branch point on the left side as shown in FIG. 5 (step 250). Arrows with solid lines represent leading edge lines whereas arrows with dotted lines represent trailing edge lines. Here, only the edge lines i and j that are categorized as "trailing" are subjected to the processing.

Figure 7A:
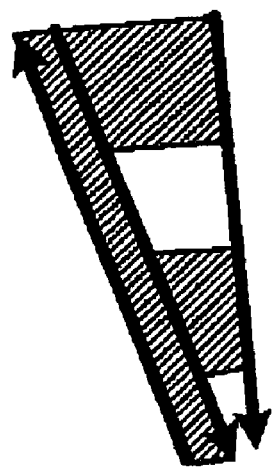
FIGS. 7A and 7B are explanatory diagram of a selection of trailing edge lines i and j shown in FIG. 6.
Figure 7B:
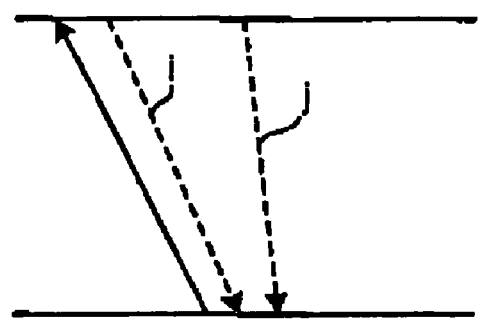

FIGS. 7A and 7B are explanatory diagrams to show the reason why the trailing edge lines i and j are employed for the process of FIG. 6 (left side branch point detecting process: Step 250).

FIG. 7A shows another exemplary image of the lane sign in the vicinity of the branch point shown in FIG. 4. In the example of FIG. 7A, in the captured road surface image, block-shaped dotted line overlaps with a white line that indicates the left-side boundary of the branch. Thus, the shapes of the lane signs are relatively ambiguous and difficult to distinguish. In such a condition, sometimes no white line pair is detected for the trailing edge line j or two lines (trailing edge lines i and j) are assumed to be the counterpart in the white line pair for the left most leading edge line.

According to the branch point detecting process as described below, even in such a condition, an object of the process can be securely selected without fail as can be seen from FIG. 7, since the object is limited to the trailing edge lines i and j. Thus no error occurs in branch determination.

When the branch point on the right side is to be detected, the process object is limited to the leading edge lines i and j.

Figure 8:
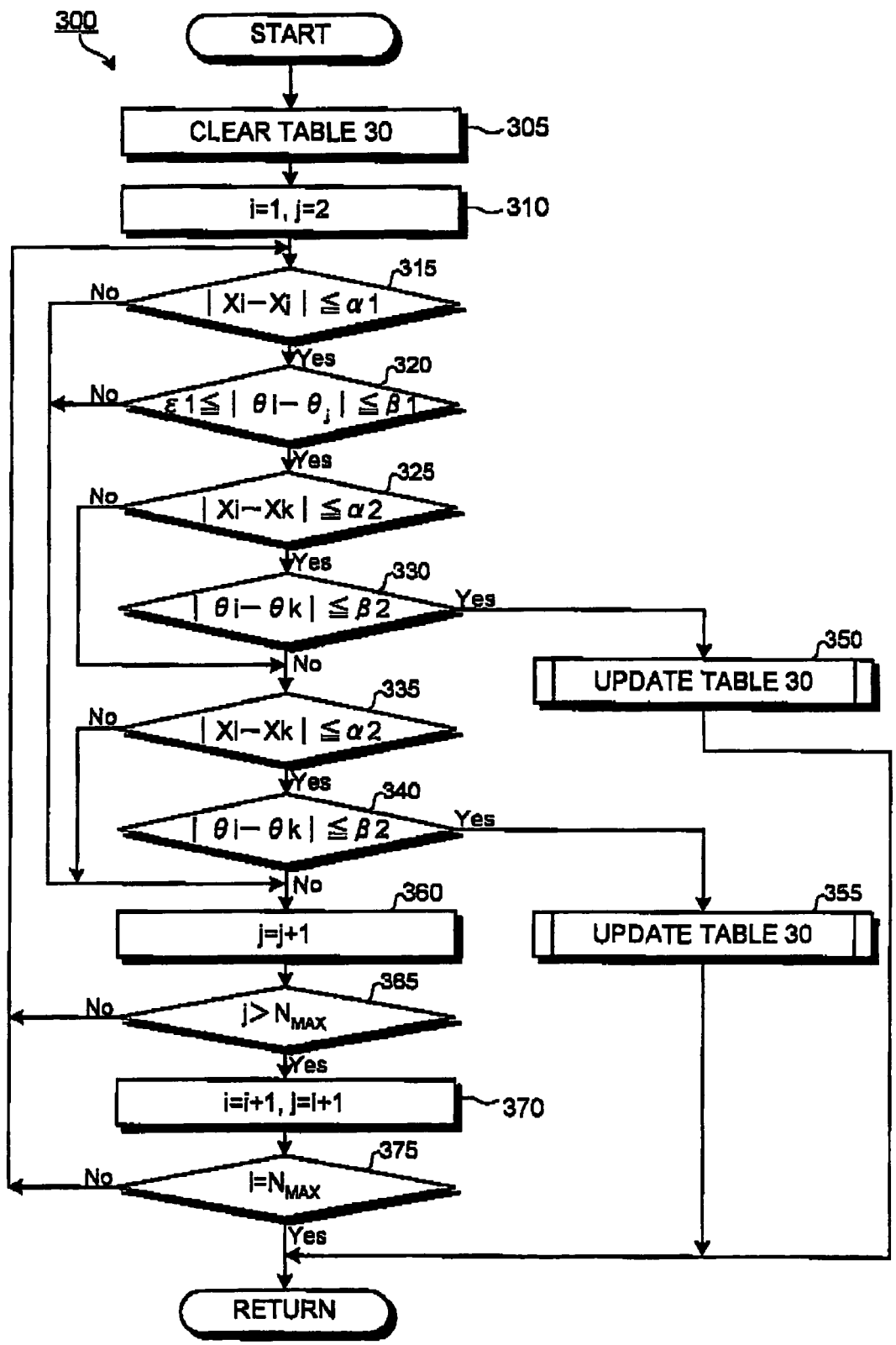
FIG. 8 is a flow chart of a subroutine 300 for executing a branch point detecting process.

FIG. 8 is a flow chart of a subroutine 300 which is called up by step 250 of FIG. 3 for executing the branch point detecting process.

In the subroutine 300, first at step 305 the table 30 is cleared to be zero. In the subroutine 300, only the trailing edge lines are registered for variables I and J in the table 30, hence, both the variables I and J are the edge line numbers of edge lines with a branch point where c=trailing.

At step 310, the control variables i and j of the integer type are initialized.

At steps 315 to 340, a determining process is performed at each step to check if the following conditional expressions 1 to 6 are satisfied.

| | |
|---|---|
| $\|X_i - X_j\| \leq \alpha 1$ | conditional expression 1 |
| $\epsilon 1 \leq \|\theta_i - \theta_j\| \leq \beta 1$ | conditional expression 2 |
| $\|X_i - X_k\| \leq \alpha 2$ | conditional expression 3 |
| $\|\theta_i - \theta_k\| \leq \beta 2$ | conditional expression 4 |

The conditional expressions 1 and 2 serve to verify whether the edge lines i and j are located at a certain angle and distance with respect to each other so that they can form a branch point.

For example, values of $\epsilon 1$ and $\beta 1$ may be approximately 2° and 20°, respectively, since the branch from the main highway road usually forms a mild angle, though the branch must form a certain angle. Such a threshold value may be set for every highway or may be dynamically changed depending on a navigation system to be employed in combination.

The conditional expressions 3 and 4 serve to verify whether the edge line i and a predetermined reference edge line k are located at substantially the same angle and distance.

At step 350, the table 30 is updated as follows.

Step a1: Find the y-coordinate of the crossing point of edge lines i and j, and store the value in a save area Y.

Step a2: Store the edge line number (=i) of the edge line that is substantially the same with the edge line k in a save area I.

Step a3; Store the edge line number j of the other edge line in a save area J.

In the first embodiment, it is assumed that there is only one or no branch point in one image. Hence, at the detection of one branch point, the subroutine 300 performs steps a1 to a3 and the process returns to steps a1 to a3.

| | |
|---|---|
| $\|X_j - X_k\| \leq \alpha 2$ | conditional expression 5 |
| $\|\theta_j - \theta_k\| \leq \beta 2$ | conditional expression 6 |

Figure 9:
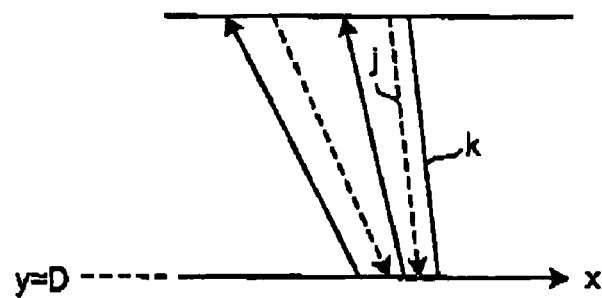
FIG. 9 is an explanatory diagram of an example of content to be checked at the subroutine 300.

The conditional expressions 5 and 6 serve to verify whether the edge line j and the reference edge line k are located at substantially the same angle and distance. FIG. 9 is an explanatory diagram of the verification manner. The reference edge line k in FIG. 9 is a straight line (edge line) representing a current lane boundary position estimated from the position of the edge line adopted as the left side lane boundary position at the previous control cycle (0.1 second earlier, for example). Through the verification of relation between such edge lines j and k with the conditional expressions 5 and 6, uniformity (match or mismatch) of the edge lines j and k can be verified. When the edge lines j and k indicate the same white line, the crossing point of the edge lines i and j can be determined to be the branch point.

At step 355, the table 30 is updated according to the following procedure.

Step b1: Find the y-coordinate of the crossing point of the edge lines i and j, and store the value in the save area Y.

Step b2: Store the edge line number (=i) of the edge line that is substantially the same with the edge line k in the save area I.

Step b3: Store the edge line number i of the other edge line in the save area J.

At steps 360 to 375, a loop process of the table 20 is controlled. The loop process is controlled so that any combination of edge lines are not skipped or overlapped. For example, here, $N_{MAX}$ is the recorded number of all edge lines registered in the format of the table 20.

Figure 10A:
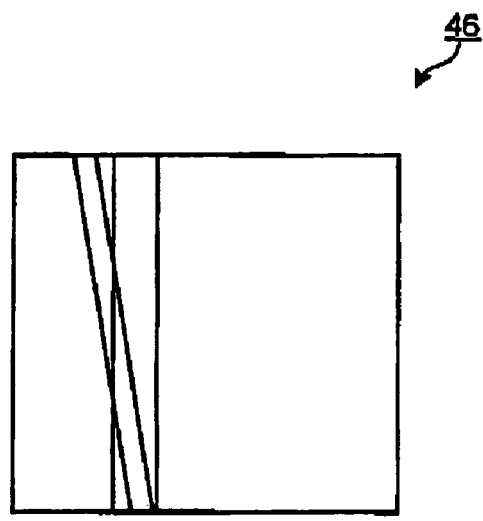
FIG. 10A is a graph of an image obtained as a result of branch point detection and FIG. 10B is a graph of an image obtained as a result of lane boundary determination.

After the execution of the subroutine 300, the process returns to the caller. With these processes, step 250 is finished. A graph 46 of FIG. 10A shows an image obtained as a result of the branch point detecting process as described above.

Figure 10B:
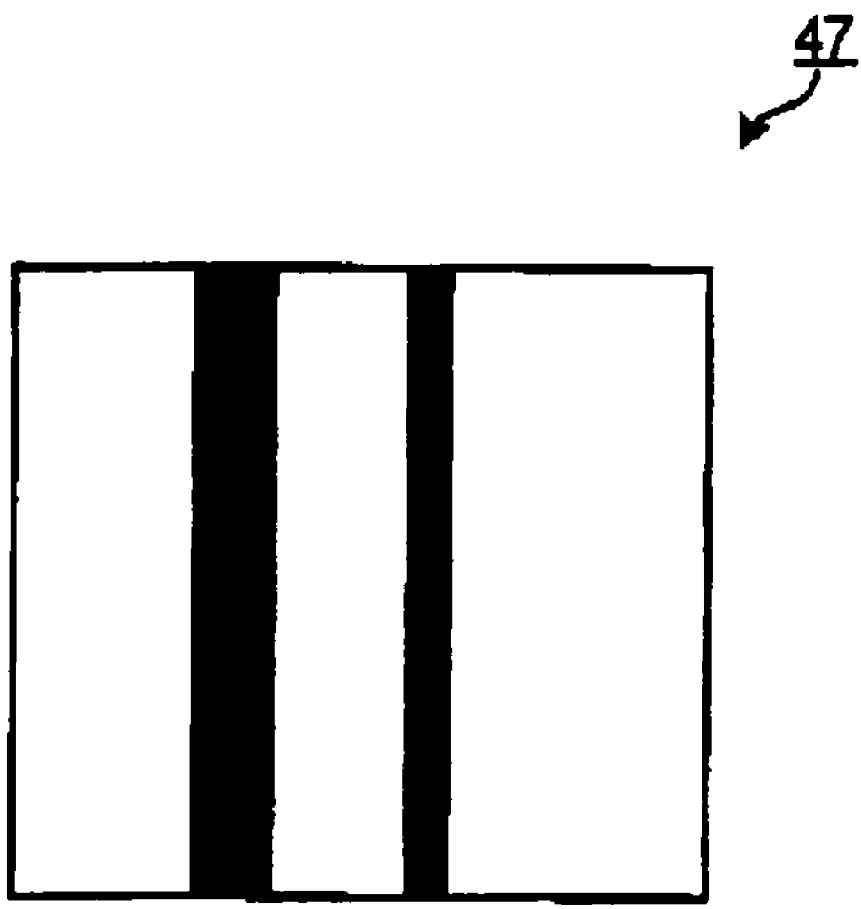

A graph 47 of FIG. 10B shows an image obtained as a result of the lane boundary determination, and shows a condition after the execution of step 420 of a subroutine 400 described below with reference to FIG. 11.

Figure 11:
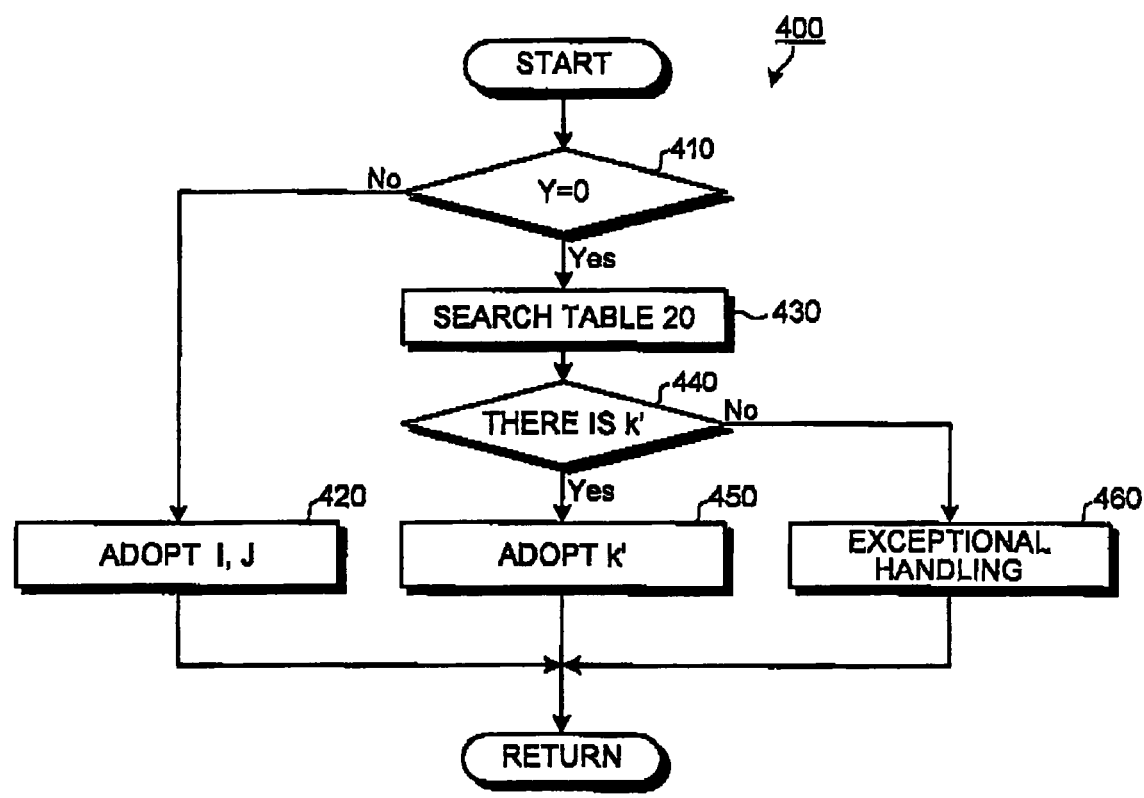
FIG. 11 is a flow chart of a subroutine 400 for executing a lane boundary determining process.

FIG. 11 is a flow chart of the subroutine 400 that is called up by step 260 of FIG. 3 for executing the lane boundary determining process.

At step 410, the value of Y is checked with reference to the branch point data in the table 30. When Y≠0, it is determined that there is a branch point and the process goes to step 420.

At step 420, an edge line that has an edge line number stored in the save areas I and J of the table 30 is adopted as the left side lane boundary position. Here, when y<Y, the edge line that is substantially the same with the reference edge line k and whose edge line number is stored in the save area I is employed, whereas when y≧y, the edge line inside (with a larger angle θ) is employed.

Thus, when the branch point is detected, the innermost edge line among the pertinent edge lines is selected as the lane boundary position. Hence, when there is a branch road, the vehicle may ignore the branch road and keep running along the main road. This is convenient, since a main purpose of the vehicle driving support system or the like is usually to support a continuous driving of the vehicle on the main highway road up to predetermined branches, parking areas, service areas, or the toll booths.

On the other hand, when Y=0, it means that there is no branch point. Then, at step 430, search is performed on the table 20 with a criteria to find an edge line k' which is most consistent with the assumed lane width. If there is a proper edge line k', the position of the edge line k' is set as a new lane boundary position at step 450. If there is no proper edge line k', an exceptional handling of step 460 is executed.

At step 460, a lane boundary position on the left side is calculated based on the lane boundary position on the right side and the lane width of the currently driving lane. Alternatively, the lane boundary position on the left side may be calculated based on the latest reference edge line k. Alternatively, the process may be abnormally finished. For example, the process may be abnormally finished when the lane boundary position is calculated as described above and the predetermined numbers of exceptional handlings of step 460 occur repeatedly.

Finally, at step 270 of FIG. 3, the determined lane boundary position is supplied as an output to a storage area which can refer to an application program relating to an automatic steering device or the like.

When the lane boundary detector 100 is structured, for example, according to the control technique as described above, the lane boundary detector which is immune to the detection error and time lag with respect to the branch determination can be provided at a practical cost.

Figure 12:
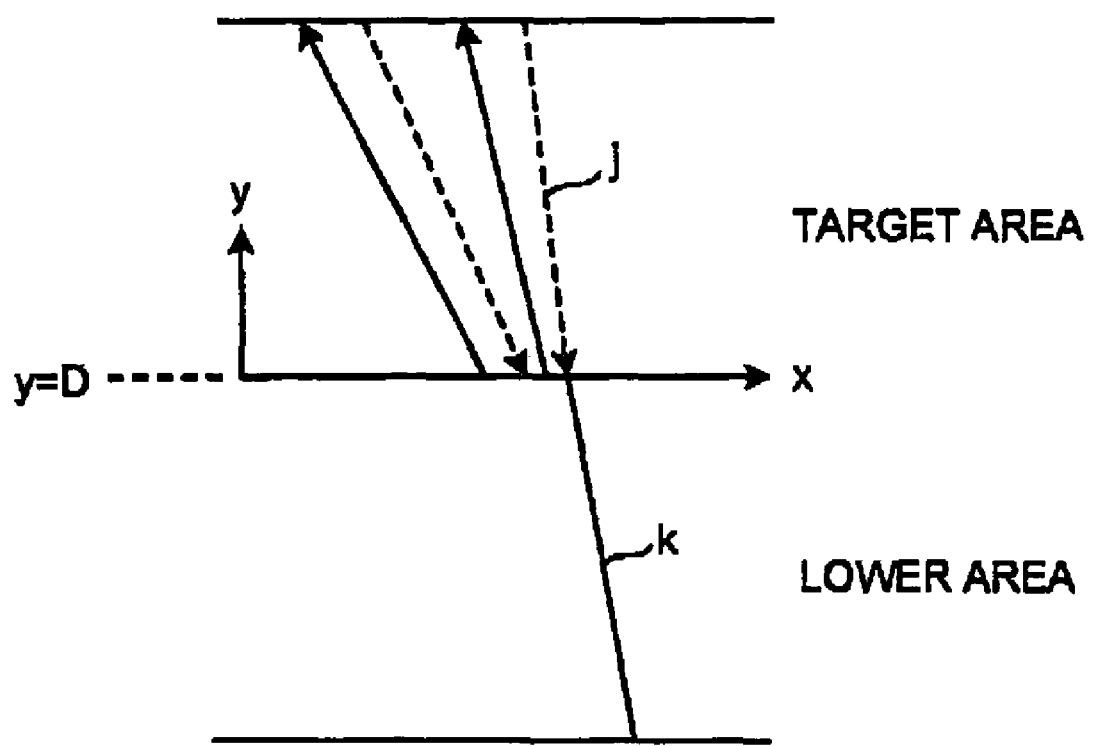
FIG. 12 is an explanatory diagram of another example of content to be checked at the subroutine 300 of FIG. 9.

FIG. 12 shows an example of a modification (second embodiment) of the content to be checked as shown in FIG. 9. In this example, an image dividing unit is provided to horizontally divide the input image into upper and lower areas. As the reference edge line k described above, an edge line that matches with the lane boundary position in the lower area of the horizontally divided image is employed. The image may be divided into three, four, or more areas.

When the road surface image is divided in the horizontal direction, usually the lower area image includes an image of a road surface area, at least a part of which has been the processing object in the previous control cycle. Since the road surface area has been the object of analysis in the previous cycle if the analysis results from the previous cycle are utilized, it is highly likely that more reliable determination of the lane boundary position is achieved.

Hence, even when the reference edge line k is defined based on the horizontally divided image located at a lower area than a target area, substantially the same effect and advantages as the first embodiment May be obtained. In other words, based on the constraints imposed by the spatial continuity of the area, the validity of the detected branch pattern as the lane boundary can be verified to effectively delete noise information.

The embodiments of the present invention are not limited to the embodiments as described above. Other modifications are possible as exemplified below. Such modification and application also bring about the advantages of the present invention.

Though in the first embodiment, the x-coordinate of the edge line on the straight line y=D and the angle θ with respect to the y-axis are employed as indicators to represent the position and the direction (inclination) of the edge line, other values may be employed as such parameters. For example, provided that an xy-orthogonal coordinate plane represents the road surface plane, where the positive direction of the y-axis represents the forward direction of the vehicle, the positive direction of the x-axis represents the right ward direction of the vehicle, and the equation of the edge line of the lane sign is expressed as x=ay+b, the coefficients of the equation, such as "a" and "b" may be employed as the parameter, i.e., two variables (p, q).

The present invention relates to detectors that detect a position of boundary of a lane sign drawn on a road surface based on an image input vial a vehicle-mounted camera. Hence, the lane boundary detector according to the present invention is useful for, for example, a vehicle driving support system that automatically keeps the vehicle on the lane.

What is claimed is:

1. A lane boundary detector comprising:
   a vehicle mounted camera that obtains an input image to detect, in real time while a vehicle is running, a right and a left boundary position of a lane defined by a lane sign drawn on a road surface on which the vehicle runs;
   an edge point extracting unit that extracts a plurality of edge points of the lane sign from the input image;
   an edge line extracting unit that extracts a plurality of edge lines constituting a contour of the lane sign from the edge points extracted by the edge point extracting unit to formulate a position and a direction of each of the edge lines as a straight line on the road surface, using a parameter set of real numbers including at least a first variable p and a second variable q;
   a branch point detecting unit that (1) verifies, based on the input image obtained by the vehicle mounted camera, whether a characteristic difference vector $(p_i-p_j, q_i-q_j)$ defined with the first variable p and the second variable q, with respect to a first edge line i and a second edge line j, which are extracted, and a position and a direction of each of which are formulated by the edge line extracting unit falls within a predetermined appropriate range, (2) judges that a crossing point of the first edge line i and the second edge line j out of the edge lines can be a branch point of the lane when the characteristic difference vector $(p_i-p_j, q_i-q_j)$ falls within a predetermined range, and (3) generates branch point data; and
   a lane boundary determining unit that determines the left and the right boundary positions of the lane based on a determination result by the branch point detecting unit.

2. The lane boundary detector according to claim 1, wherein
   when the road surface is represented by an xy-orthogonal coordinate plane where a positive direction of a y-axis represents a forward direction of the vehicle and a positive direction of an x-axis represents a rightward direction of the vehicle,
   the first variable is substantially the same with an x-coordinate of the first edge line or the second edge line on a straight line that satisfies y=D in front of the vehicle where D is a predetermined distance, and
   the second variable is substantially the same with an angle formed by the first edge line or the second edge line with respect to the positive direction of the y-axis.

3. The lane boundary detector according to claim 1, wherein
   when the road surface is represented by a coordinate plane where a positive direction of an x-axis represents a rightward direction of the vehicle, and when the branch point detecting unit determines whether a branch point from which a branch diverts leftward is present or not,
   each of the first edge line and the second edge line which are selected as determination data is an edge line that represents a set of points where value $\partial L/\partial x$ takes a negative minimum value, the value $\partial L/\partial x$ being obtained by partial differentiation of luminance L of the input image with respect to the x-coordinate.

4. The lane boundary detector according to claim 1, wherein
   when the road surface is represented by a coordinate plane where a positive direction of an x-axis represents a rightward direction of the vehicle, and when the branch point detecting unit determines whether a branch point from which a branch diverts rightward is present or not,
   each of the first edge line and the second edge line which are selected as determination data is an edge line that represents a set of points where value $\partial L/\partial x$ takes a positive maximum value, the value $\partial L/\partial x$ being obtained by partial differentiation of luminance L of the input image with respect to the x-coordinate.

5. The lane boundary detector according to claim 1, wherein
   any one of the branch point detecting unit and the lane boundary determining unit determines whether the branch point of the lane is present or not, based on whether a characteristic difference vector $(p_i-p_k, q_i-q_k)$ or $(p_j-p_k, q_j-q_k)$ defined with the first variable and the second variable falls within a predetermined appropriate range with respect to at least one of the first edge line and the second edge line whose crossing point is determined likely to be the branch point of the lane and a reference edge line $k(p_k, q_k)$ that is a predetermined object of comparison.

6. The lane boundary detector according to claim 5, wherein an edge line to be used as the reference edge line is determined based on the latest adopted boundary position of the lane.

7. The lane boundary detector according to claim 5, further comprising an image dividing unit that horizontally divides the input image into a plurality of areas, wherein an edge line that corresponds with the boundary position of the lane in a lower area than a target area in a horizontally divided image is employed as the reference edge line.

8. The lane boundary detector according to claim 1, wherein
   when the branch point detecting unit determines that the crossing point is the branch point of the lane,
   the lane boundary determining unit selects an edge line that is located within a range of appropriate distance from a center line of a lane on which the vehicle is currently running and that is located closest to the center line among the edge lines, as one of the left boundary position and the right boundary position with respect to the vehicle which are to be sought in the end.

9. A lane boundary detector comprising:
   a vehicle mounted camera that obtains an input image to detect, in real time while a vehicle is running, a right and a left boundary position of a lane defined by a lane sign drawn on a road surface on which a vehicle runs;
   an edge point extracting unit that extracts a plurality of edge points of the lane sign from the input image;
   an edge line extracting unit that extracts a plurality of edge lines constituting a contour of the lane sign from the edge points extracted by the edge point extracting unit to formulate a position and a direction of each of the edge lines as a straight line on the road surface, using a parameter set of real numbers including at least a first variable p and a second variable q; and
   a validity verifying unit that (1) verifies, based on the input image obtained by the vehicle mounted camera, whether a characteristic difference vector $(p_i-p_k, q_i-q_k)$ defined with the first variable p and the second variable q falls within a predetermined appropriate range or not with respect to a first edge line i, which is extracted, and a position and a direction of each of which are formulated by the edge line extracting unit and a reference edge line $k(p_k, q_k)$ that is a predetermined object of comparison, (2) judges a validity of the first edge line i out of the edge lines as the boundary position of the lane when the characteristic difference vector $(p_i-p_k, q_i-q_k)$ falls within a predetermined range, (3) judges that a crossing point of the first edge line i and the reference edge line $k(p_k, q_k)$ out of the edge lines can be a branch point of the lane, and (4) generates branch point data.

10. The lane boundary detector according to claim 9, wherein an edge line to be used as the reference edge line is determined based on the latest adopted boundary position of the lane.

11. The lane boundary detector according to claim 9, further comprising an image dividing unit that horizontally divides the input image into a plurality of areas, wherein an edge line that corresponds with the boundary position of the lane in a lower area than a target area in a horizontally divided image is employed as the reference edge line.

* * * * *